United States Patent
Kawamura

(10) Patent No.: US 7,260,035 B2
(45) Date of Patent: Aug. 21, 2007

(54) RECORDING/PLAYBACK DEVICE

(75) Inventor: Takashi Kawamura, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 482 days.

(21) Appl. No.: 10/868,800

(22) Filed: Jun. 17, 2004

(65) Prior Publication Data

US 2004/0257939 A1 Dec. 23, 2004

(30) Foreign Application Priority Data

Jun. 20, 2003 (JP) .............................. 2003-176456

(51) Int. Cl.
*G11B 15/02* (2006.01)
(52) U.S. Cl. ................. 369/47.23; 369/47.28
(58) Field of Classification Search ..................... None
See application file for complete search history.

(56) References Cited

FOREIGN PATENT DOCUMENTS

| JP | 7-044906 | 2/1995 |
|---|---|---|
| JP | 7-129190 | 5/1995 |
| JP | 11-213521 | 8/1999 |
| JP | 11-273246 | 10/1999 |
| JP | 2001-119669 | 4/2001 |
| JP | 2001-119671 | 4/2001 |

*Primary Examiner*—Paul W. Huber
(74) *Attorney, Agent, or Firm*—Wenderoth, Lind & Ponack, L.L.P.

(57) ABSTRACT

In simultaneous stream recording and playback, after playback catches up with real time live broadcast, a playback speed changing unit 2 smoothly changes a playback speed to single speed. Nevertheless, an output switching unit 4 continues to perform single-speed playback. During single-speed playback, a switching timing indicating unit 3 indicates a timing of switching to real time live broadcast to the output switching unit 4. Upon receiving the indication from the switching timing indicating unit 3, the output switching unit 4 switches its output to real time live broadcast. With this, in the case of catching-up playback, it is possible to prevent adverse effects caused by dropout of sound information at an instant when the output is changed from catching-up playback to real time live broadcast.

7 Claims, 13 Drawing Sheets

RECORDING/PLAYBACK DEVICE

BACKGROUND OF THE INVENTION

1. Field of the Invention

The present invention relates to recording/playback devices and, more specifically, to a recording/playback device having a function of simultaneously recording and reproducing television broadcast signals and audio broadcast signals.

2. Description of the Background Art

Conventionally, recording/playback devices for simultaneously recording and playing back television broadcast streams or audio broadcast streams have utilized either one or both of two types of program playback schemes: chasing playback and catching-up playback. Chasing playback simply allows simultaneous recording and playback. For example, when a user gets back home in the course of preprogrammed recording and desires to watch the program being recorded, the program is played back from the beginning at single speed without a wait for the end of recording but with recording being continued. On the other hand, catching-up playback allows fast-forward playback of a program at a speed higher than single speed with recording being continued. With this, a missed portion of the program can be quickly viewed and then, eventually, a portion currently being broadcasted can be caught up with. An example of such catching-up playback is achieved by a recording/playback device disclosed in Japanese Patent Laid-Open Publication No. 2001-119671, wherein fast-forward playback is performed at a constant "1.5 times speed with natural voice" with voice pitch not being varied. With this, speech can be easy to listen even at the time of fast-forward playback, and therefore speech information will not be missed at the time of catching-up playback.

The structure of a conventional recording/playback device adopting such a scheme as mentioned above is described below with reference to FIGS. 10 through 13.

FIG. 10 is a functional block diagram showing the conventional recording/playback device. In FIG. 10, the conventional recording/playback device includes a simultaneous recording/reading unit 1, a playback speed changing unit 15, and an output switching unit 4. The simultaneous recording/reading unit 1 simultaneously records an input signal in a storage device and reads a signal recorded in the storage device, and detects a delay time of a signal read from the storage device (hereinafter simply referred to a read signal) with respect to the input signal. The playback speed changing unit 15 changes a playback speed of the read signal. The output switching unit 4 selects either one of the input signal and the read signal for output. At the start of catching-up playback, the output switching unit 4 outputs the read signal. When the delay time detected by the simultaneous recording/reading unit 1 is below a predetermined time, that is, immediately before played-back images catch up with real-time live broadcast, the output switching unit 4 switches its output from the read signal to the input signal.

FIG. 11 is a block diagram illustrating the structure of the simultaneous recording/reading unit 1. In FIG. 11, the simultaneous recording/reading unit 1 includes a data recording section 5, the storage device 6, a data reading section 7, and a time difference detecting section 8.

The data recording section 5 records an input signal in the storage device 6. The data recording section 5 may have incorporated therein an A/D converter for digitizing an analog signal or an encoder for encoding a digital signal. The encoder includes, for example, a video encoder and an audio encoder. The video encoder is an encoding means complying with moving picture compression standards, such as MPEG1, MPEG2, MPEG4, or Windows(R) Media Video (WMV). The audio encoder is an encoding means complying with audio compression standards, such as Dolby(R) AC3, dts, MPEG1-Layer II, MPEG2-AAC, MLP, or MPEG1-Layer III (MP3). Also, in order to achieve simultaneous recording and playback, a time for recording in the storage device 6 and a time for reading from the storage device 6 may be separated from each other for alternately perform recording and playback. In this case, the data recording section 5 is generally provided with a buffer memory for temporarily recording moving pictures and sounds.

The storage device 6 is a storage medium for digital signals and has a recording capacity sufficient for storing signal data for several tens of hours. For example, as the storage device 6, a hard disk drive, DVD-RAM, DVD-RW, DVD+RW, or a Blu-ray Disc can be used.

The data reading section 7 reads the data recorded by the data recording section 5 in the storage device 6 for output as the read signal. The data reading section 7 is generally provided with a buffer memory for temporarily recording moving pictures and sounds. This makes it possible in simultaneous recording and playback to achieve a process of alternately performing recording and playback by separating the time for recording in the storage device 6 and the time for reading from the storage device 6 from each other. The data reading section 7 can have incorporated therein a decoder for decoding a digital signal. The decoder includes, for example, a video decoder and an audio decoder. The video decoder is a decoding means complying with moving picture compression standards, such as MPEG1, MPEG2, MPEG4, or Windows(R) Media Video (WMV). The audio decoder is a decoding means complying with audio compression standards, such as The audio encoder is an encoding means complying with audio compression standards, such as Dolby(R) AC3, dts, MPEG1-Layer II, MPEG2-AAC, MLP, or MPEG1-Layer III (MP3).

The time difference detecting section 8 detects a difference in the time domain between a signal handled by the data recording section 5 and a signal handled by the data reading section 7. During catching-up playback, the time difference detecting section 8 compares a time stamp of the signal being recorded by the data recoding section 5 and a time stamp of the signal being read by the data reading section 7, and then detects their time difference.

Referring back to FIG. 10, the playback speed changing unit 15 includes a motion picture playback speed changing section and an audio playback speed changing section, both of which are not shown. The motion picture playback speed changing section changes a motion picture playback speed by using a playback scheme, such as, under MPEG standards, a playback scheme of skipping P pictures and B pictures or a playback scheme of skipping only B pictures. The audio playback speed changing section changes an audio playback speed by using the Pointer Interval Controlled OverLap and Add (PICOLA), in which decimation and insertion of a repetitive time waveform portion is performed to achieve compression and expansion of time-domain data, the OLA, in which cross fading of adjacent pieces of frame data is performed at predetermined time intervals to achieve compression and expansion of time-domain data, or the SOLA, in which a correlation between adjacent pieces of frame data is calculated and then the cross fading of a portion having the closest correlation is performed to achieve compression and expansion with high sound quality. Here, when the user selects catching-up playback through operation of a built-in button of the device or a remote controller, the playback speed changing unit 15 performs fast-forward playback. When fast-forward playback catches up with real time live broadcast currently being recorded, the playback speed changing unit 15 stops the speed changing process. At the same time, the simultaneous recording/reading unit 1 (the time difference detecting section 8) reports to the output switching unit 1 that catching-up playback has caught up with real time live broadcast. Upon reception of the report, the output switching unit 4 instantly switches the output to real time live broadcast.

As such, by combining a simultaneous recording/playback process and a playback speed changing process, a catching-up playback function can be achieved such that, for example, after a predetermined time has elapsed from the start of recording a program being broadcasted, the program is played back from the beginning at a 1.5 times speed while the recording continues, and then playback eventually catches up with real time live broadcast. FIG. 12 depicts an output (read signal or input signal) from the output switching unit 4. In FIG. 12, the horizontal axis represents a real time, whilst the vertical axis represents a broadcast time. FIG. 12 depicts an exemplary case where a real time live broadcast program (a two-hour program is assumed herein) is started to be broadcasted and recorded simultaneously and, when 20 minutes elapse from the start, catching-up playback (fast-forward playback at an approximately 1.4 times speed) is started. For example, when 50 minutes elapse from the start of recording, broadcast contents at a time after 40 minutes from the start of broadcasting the program are output. When 55 minutes elapse from the start of catching-up playback (that is, after 75 minutes from the start of recording), catching-up playback catches up with real time live broadcast. At this time, the output from the output switching unit 4 is switched from the read signal (catching-up playback) to the input signal (real time live broadcast).

However, the above-described conventional recording/playback device has the following problems. In the conventional recording/playback device, when catching-up playback catches up with real time live broadcast, simultaneous recording/playback is instantly switched to real time live broadcast. Whilst the recording process requires a procedure including a series of processes of encoding an input signal, recording the encoded signal in the storage device, reading the recorded signal from the recording device, and then decoding the read signal, real time live broadcast does not require such procedure. Therefore, a time lag always occurs between the input signal and the read signal. Therefore, dropout of sound information occurs at an instant when a switch is made to real time live broadcast. Moreover, the user cannot control over a switching timing. Therefore, when a switch is made while an actor is speaking his lines, for example, these lines cannot be completely output, thereby making the user feel uncomfortable. FIG. 13 depicts a state where dropout of sound information at a switching timing (at the time of around 75 minutes from the start of the program) occurs. In FIG. 13, when the time lag is one second, for example, the conventional recording/playback device determines that catching-up playback catches up with real time live broadcast when outputting broadcast contents at the time of 75 minutes sharp from the start of the program, and then switches the output. Consequently, sound information between 75 minutes sharp to 75 minutes and one second is not played back and therefore is dropped.

SUMMARY OF THE INVENTION

An object of the present invention is to provide a recording/playback device that can prevent adverse effects caused during catching-up playback by dropout of sound information at an instant when the output is switched from catching-up playback to real time live broadcast.

The above object is achieved by the following recording/playback device.

A first aspect of the present invention is directed to a recording/playback device, including: a simultaneous recording/reading unit operable to simultaneously record an input signal in a storage device and to read an input signal recorded in the storage device as a read signal; a playback speed changing unit operable to change a playback speed of the read signal without a sound dropout; an output switching unit operable to alternatively select one of the input signal and the read signal and to output the selected signal to an output device; and a switching timing indicating unit operable to indicate a switching timing to the output switching unit. The playback speed changing unit increases the playback speed of the read signal higher than single speed and, after playback is started, when a delay time of the read signal with respect to the input signal is below a predetermined time, decreases the playback speed of the read signal to single speed. After the delay time of the read signal with respect to the input signal is below the predetermined time, upon receiving an indication from the switching timing indicating unit, the output switching unit switches an output from the read signal to the input signal. Note that the playback speed changing unit may change the playback speed of the read signal output from the simultaneous recording/reading unit or the playback speed of the read signal output from the output switching unit.

In a second aspect of the present invention, the switching timing indicating unit indicates the switching timing to the output switching unit upon receiving an instruction from a user.

In a third aspect of the present invention, the playback speed changing unit includes: a playback speed determining unit operable to appropriately determine the playback speed of the read signal so that the playback speed is made close to single speed in a stepwise manner when a delay time of a reading time of the read signal with respect to a recording time of the input signal has a value larger than a predetermined threshold, and then to determine, when the delay time of the reading time has a value smaller than the predetermined threshold, the playback speed of the read signal as being single speed; and a speed change processing unit operable to change the playback speed of the read signal to the playback speed determined by the playback speed determining unit.

In a fourth aspect of the present invention, the recording/playback device further includes a notifying unit operable to notify a user that the playback speed of the read signal is changed to single speed when the delay time of the read signal with respect to the input signal is below the predetermined time and the playback speed changing unit changes the playback speed of the read signal to single speed. Note that the notifying unit may notify the above through display on a screen or via sounds or the like.

According to the structure of the recording/playback device of the present invention, a time difference between recording and playback during simultaneous recording and playback is monitored. Immediately before playback catches up with real time live broadcast, the playback speed of the read signal is changed to single speed. Then, based on an instruction from the switching timing indicating unit, a change can be made to real time live broadcast at an appropriate timing with less adverse effects of dropout of sound information. Also, by externally providing an instruction to control input/output of a control signal, the user can select a sound-free scene by himself or herself as required to make a switch to real time live broadcast.

In a fifth aspect of the present invention, the switching timing indicating unit includes a CM (Commercial Message) segment detecting unit operable to detect a CM segment in the input signal, and instructs the output switching unit to switch an output signal during the CM segment detected by the CM segment detecting unit.

According to the fifth aspect, a CM segment can be automatically detected, and a switch can be made to real time live broadcast during the CM segment. Consequently, discomfort caused by discontinuity of sound in the program or the like can be prevented.

In a sixth aspect of the present invention, the switching timing indicating unit includes a soundless segment detecting unit operable to detect a soundless segment in the input signal, and instructs the output switching unit to switch an output signal during the soundless segment detected by the soundless segment detecting unit.

According to the sixth aspect, by detecting a soundless segment and making a change to real time live broadcast during the soundless segment, a switch without sound interruption in the program can be achieved.

In a seventh aspect of the present invention, the switching timing indicating unit includes a voiceless segment detecting unit operable to detect a voiceless segment in the input signal, and instructs the output switching unit to switch an output signal during the voiceless segment detected by the voiceless segment detecting unit.

According to the seventh aspect, by detecting a voiceless segment and making a change to real time live broadcast during the voiceless segment, a switch without interruption in human speech at the time of reading lines or the like can be achieved.

These and other objects, features, aspects and advantages of the present invention will become more apparent from the following detailed description of the present invention when taken in conjunction with the accompanying drawings.

DESCRIPTION OF THE PREFERRED EMBODIMENTS

With reference to the attached drawings, embodiments of the present invention are described below.

First Embodiment

Figure 1:
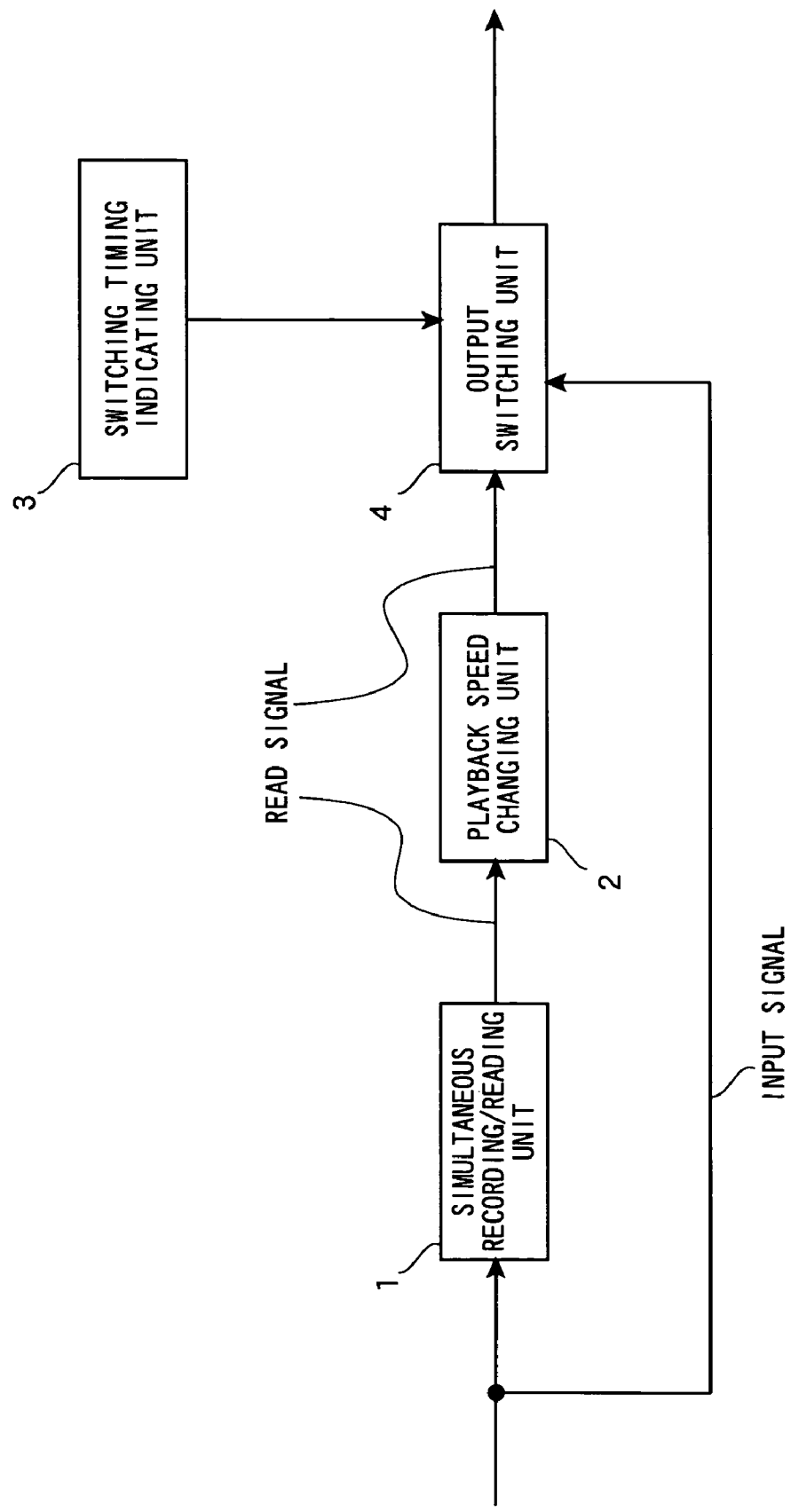
FIG. 1 is a functional block diagram showing a recording/playback device according to a first embodiment of the present invention.

With reference to FIGS. 1 through 5, a recording/playback device according to a first embodiment of the present invention is described below. FIG. 1 is a block diagram showing the structure of the recording/playback device according to the first embodiment. In FIG. 1, the recording/playback device includes a simultaneous recording/reading unit 1, a playback speed changing unit 2, a switching timing indicating unit 3, and an output switching unit 4.

The simultaneous recording/reading unit 1 simultaneously records an input signal in a storage device and reads a signal from the storage device. Also, the simultaneous recording/reading unit 1 outputs a difference in the time domain between the input signal and the read signal. Here, the input signal is a signal directly received by a tuner or the like. The input signal may be a signal, such as a television broadcast signal, composed of moving pictures and sounds, or may be a signal, such as a radio broadcast signal, composed of only sounds. Furthermore, the read signal is a signal read from the storage device, that is, an input signal once recorded in the storage device and then read from the storage device. The playback speed changing unit 2 changes a playback speed of the read signal output from the simultaneous recording/reading unit 1. The switching timing indicating unit 3 indicates, to the output switching unit 4, a switching timing for switching an output from the read signal to the input signal. The output switching unit 4 switches the output from the read signal to the input signal in accordance with the indication of the switching timing indicating unit 3.

Figure 2:
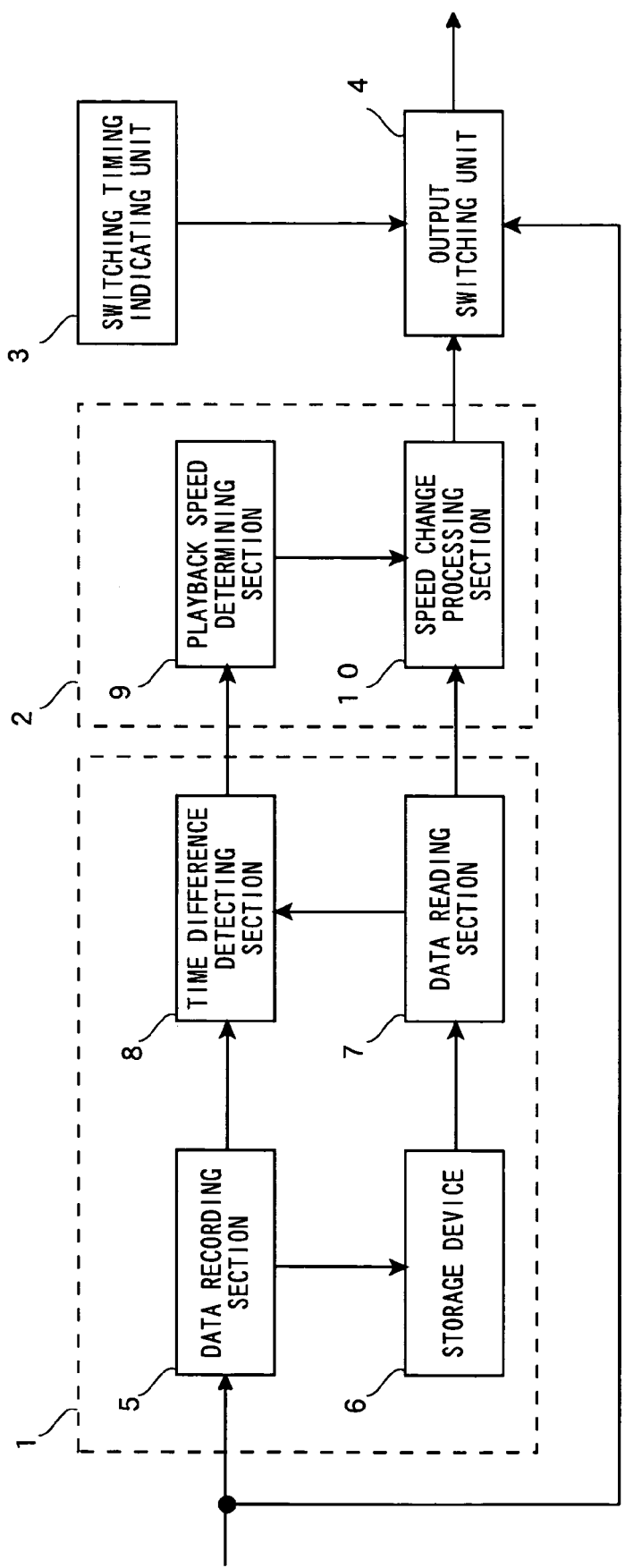
FIG. 2 is a block diagram showing a functional structure of each of a simultaneous recording/reading unit 1 and a playback speed changing unit 2.

FIG. 2 is a block diagram showing the structure of each of the simultaneous recording/reading unit 1 and the playback speed changing unit 2. In FIG. 2, the simultaneous recording/reading unit 1 includes a data recording section 5, the storage device 6, a data reading section 7, and a time difference detecting section 8. The playback speed changing unit 2 includes a playback speed determining section 9 and a speed change processing section 10.

The data recording section 5 records the input signal in the storage device 6. The data reading section 7 reads the signal recorded by the data recording section 5 from the storage device 6. Also, the data reading section 7 outputs the signal read from the storage device 6 (the read signal) to the speed change processing section 10. The time difference detecting section 8 detects a difference in the time domain between the input signal and the read signal by, for example, comparing a time stamp of the input signal and a time stamp of the read signal. Also, the time difference detecting section 8 notifies the playback speed determining section 9 of the detected difference as time difference information.

The playback speed determining section 9 determines the playback speed of the read signal based on the time difference information detected by the time difference detecting section 8. Also, the playback speed determining section 9 instructs the speed change processing section 10 to change the playback speed of the read signal to the determined playback speed. When the time difference information detected by the time difference detecting section 8 has a value that is equal to or larger than a predetermined value (for example, 300 milliseconds), the playback speed determining section 9 determines an arbitrary speed higher than single speed as the playback speed. On the other hand, when the time difference information has a value that is smaller than the predetermined value, the playback speed is determined as single speed. Here, the predetermined value is preferably a value that is larger than a total amount of delay in the simultaneous recording/reading unit 1 and the playback speed changing unit 2 and also is as small as possible. This is because, as the predetermined value is larger, the amount of sound information that will be dropped at the time of switching to real time live broadcast is larger. The playback speed determining section 9 can determine the playback speed in accordance with an instruction supplied by the user through a built-in button of the device or a remote controller, for example. That is, the user can increase or decrease the playback speed during catching-up playback, or can further cause playback to pause.

The speed change processing section 10 changes the playback speed of the read signal output from the data reading section 7. Here, it is assumed that the speed change processing section 10 has a function of changing the playback speed of the read signal without a sound dropout (for example, changing the playback speed from a 1.5 times speed to single speed). Such a technology for changing the playback speed without a sound dropout is well known, and therefore is not described herein. When the time difference information detected by the time difference detecting section 8 has a value smaller than the predetermined value, upon receiving an instruction from the playback speed determining section 9, the playback speed change processing section 10 changes the playback speed to single speed without a sound dropout.

Referring back to FIG. 1, the switching timing indicating unit 3 indicates an output switching timing to the output switching unit 4. In the present embodiment, an indication of the switching timing is achieved by the user operating the built-in button of the device or the remote controller.

Upon receiving the indication from the switching timing indicating unit 3, the output switching unit 4 switches the signal to be output to a display, a loudspeaker, or the like to the input signal (that is, real time live broadcast being recorded) or the read signal (catching-up playback). Here, a difference in the time domain between the input signal and the read signal (that is, the time difference information detected by the time difference detecting section 8) is smaller than the predetermined value, the output switching unit 4 continues to output the read signal being played back at single speed from the playback speed changing unit 2. That is, by contrast to the conventional case where the output switching unit 4 instantly switches the output from the read signal to the input signal when catching-up playback catches up with real time live broadcast, the output switching unit 4 does not instantly switch the output, but continues playback of the read signal at single speed in the present invention. Then, upon receiving a switching instruction from the switching timing indicating unit 3, the output switching unit 4 switches the output from the read signal to the input signal.

When the time difference between the input signal and the read signal (that is, between real time live broadcast and catching-up playback) is sufficiently large, catching-up playback is performed at the playback speed specified by the user. Then, until catching-up playback catches up with the real time live broadcast, the playback speed may be changed in a stepwise manner. An example of a scheme of controlling the playback speed is as follows. When the time difference between the input signal and the read signal is large, catching-up playback is performed at a user-specified playback speed (for example, a 1.5 times speed). Then, as the time difference becomes small, the playback speed is made close to single speed in a stepwise manner (for example, from a 1.5 times speed to a 1.2 times speed). Then, when the time difference is smaller than the predetermined value, the playback speed is set at single speed. Also, the time difference detecting section 8 may monitor the time difference between the input signal and the read signal once after the playback speed is set to single speed. For example, when the user performs a pause operation or the like during playback at single speed, the time difference between the input signal and the read signal becomes larger than the predetermined value. In this case, the time difference detecting section 8 instructs the speed change processing 10 to switch the playback speed from single speed to an arbitrary speed higher than single speed.

Note that the present embodiment may be applied to any catching-up playback as long as it allows playback to be continued at single speed when catching up with real time live broadcast and allows the output to be switched to real time live broadcast upon an instruction from the user.

Figure 3:
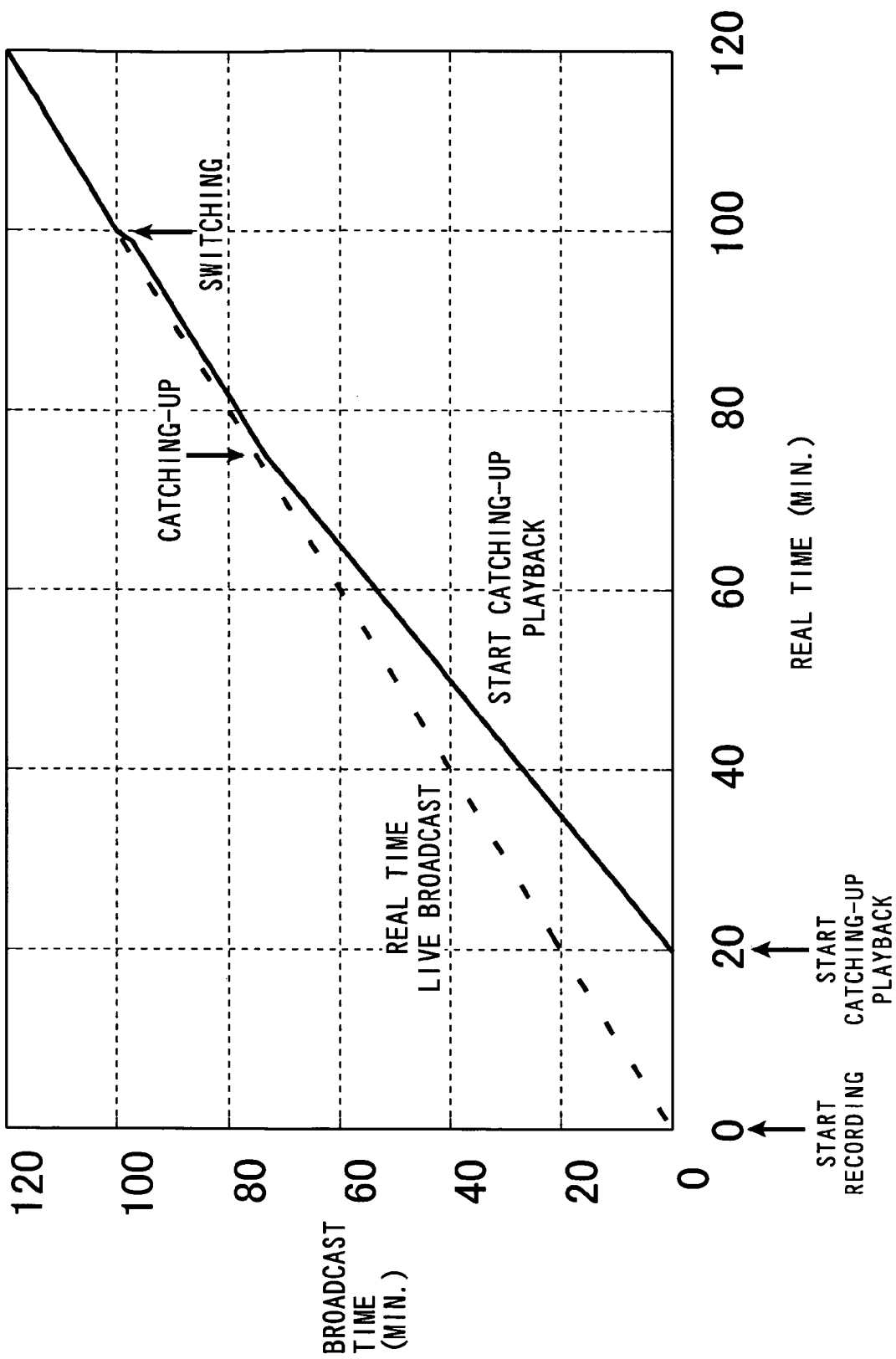
FIG. 3 is an illustration showing an output from an output switching unit 4 according to the first embodiment of the present invention.
Figure 12:
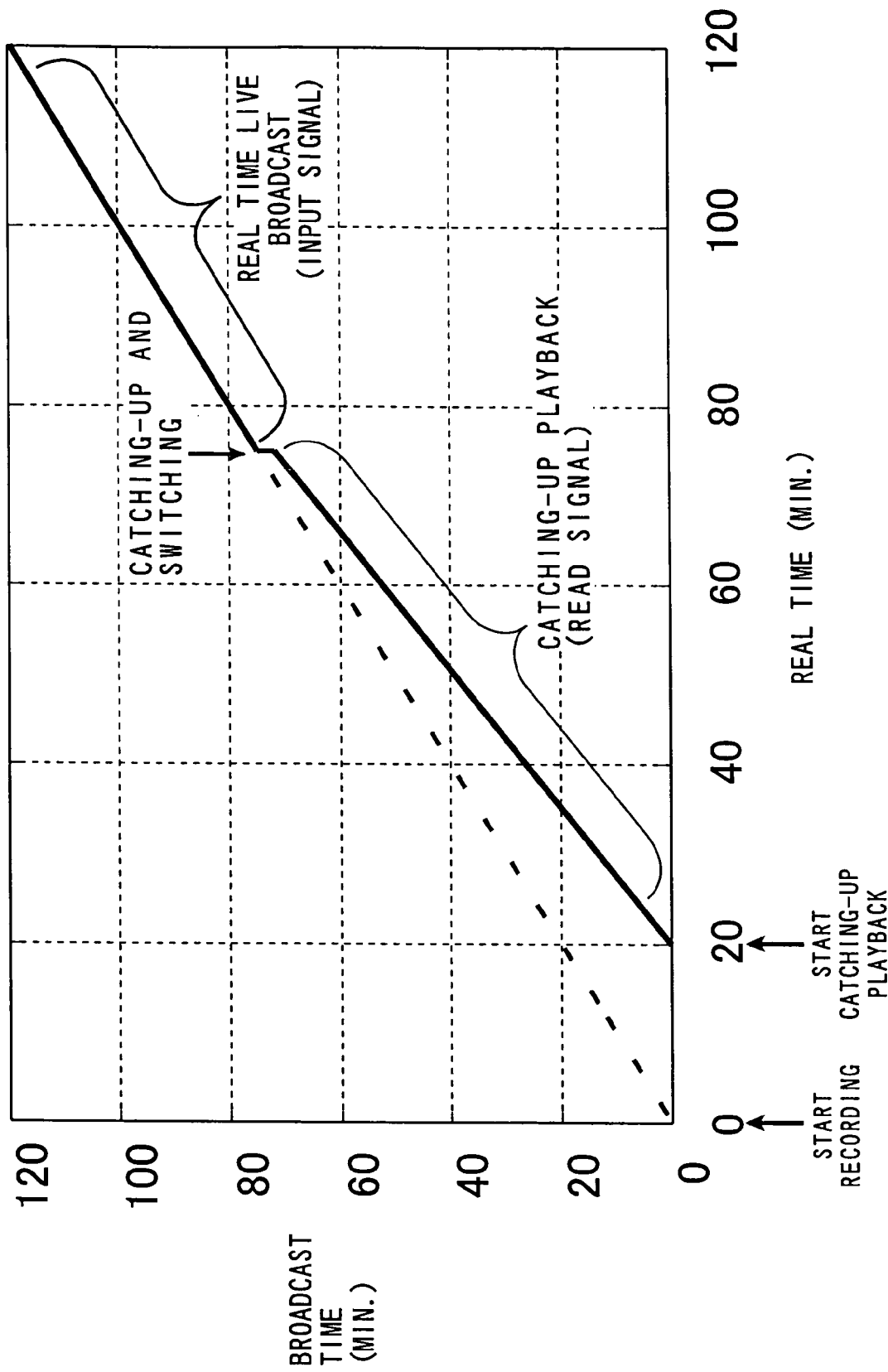
FIG. 12 is an illustration showing an output from the output switching unit 4 in the conventional recording/playback device.
Figure 13:
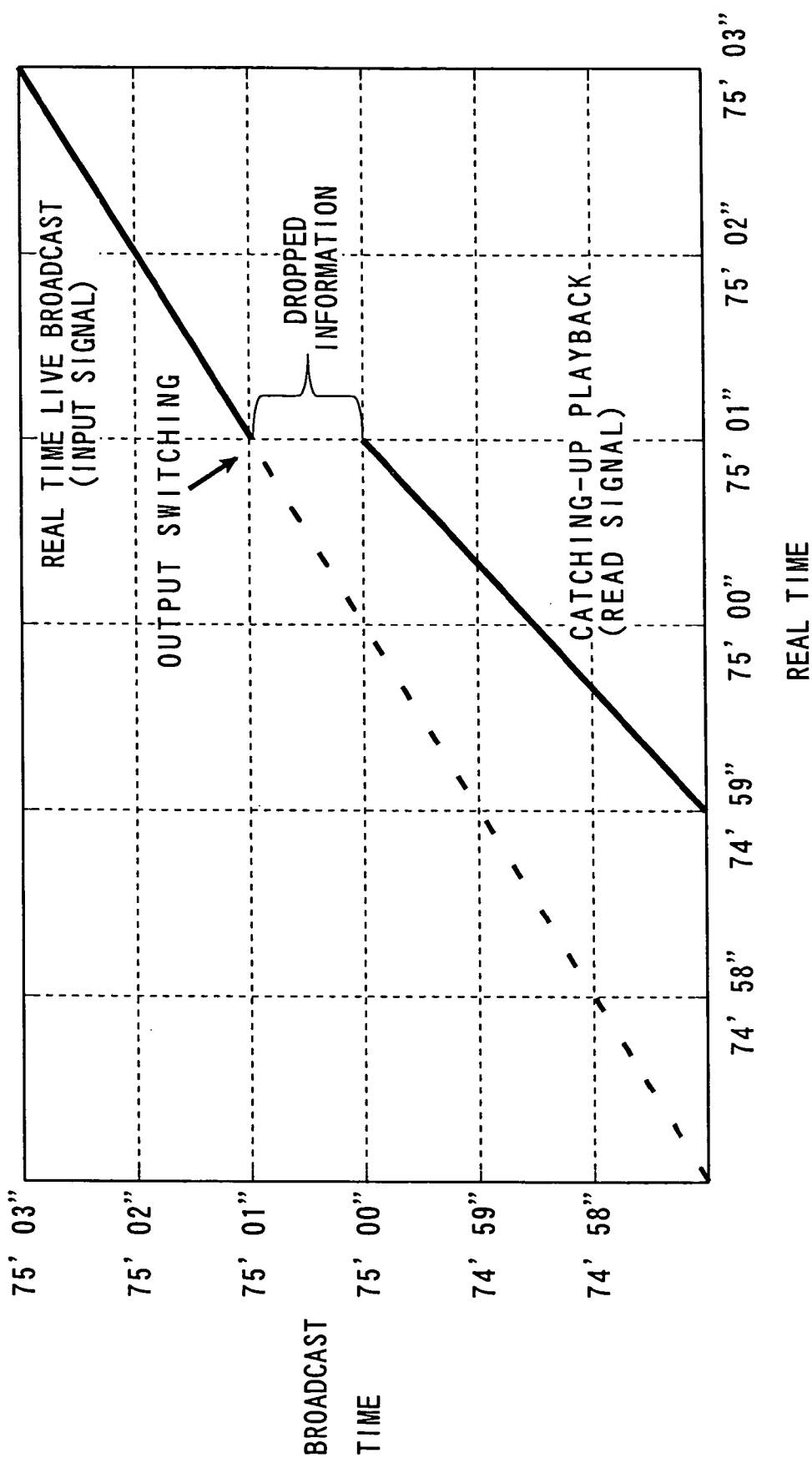
FIG. 13 is an illustration showing dropout of information at the time of an output switching process performed by the output switching unit 4 in the conventional recording/playback device.

As described above, according to the first embodiment, even when catching-up playback catches up with real time live broadcast, catching-up playback is not instantly switched to real time live broadcast but is continued. Then, with the user issuing a switching instruction to the output switching unit 4, a switch can be made to real time live broadcast at an arbitrary timing. Therefore, the user can switch to real time live broadcast at the time when no sound is produced. Consequently, adverse effects caused by dropout of sound information at an instant when a switch is made to real time live broadcast can be minimized. FIG. 3 depicts an output (read signal or input signal) from the output switching unit 4 according to the present invention. In FIG. 3, the horizontal axis represents a real time, whilst the vertical axis represents a broadcast time. FIG. 3 depicts an exemplary case where a real time live broadcast program (a two-hour program is assumed herein) is started to be broadcasted and recorded simultaneously and, when 20 minutes elapse from the start, catching-up playback (fast-forward playback at an approximately 1.4 times speed) is started. For example, when 50 minutes elapse from the start of recording, broadcast contents at a time after 40 minutes from the start of broadcasting the program are output. When 55 minutes elapse from the start of catching-up playback (that is, after 75 minutes from the start of recording), catching-up playback catches up with real time live broadcast. At this time, the output switching unit 4 does not instantly switch the output but allows playback to be continued for a while at single speed. Then, with the user issuing a switching instruction 100 minutes after the start of recording, the output of the output switching unit 4 is switched from the read signal (catching-up playback) to the input signal (real time live broadcast). That is, compared with FIG. 12, the user can arbitrarily control the timing at which the output is switched to real time live broadcast.

Figure 4:
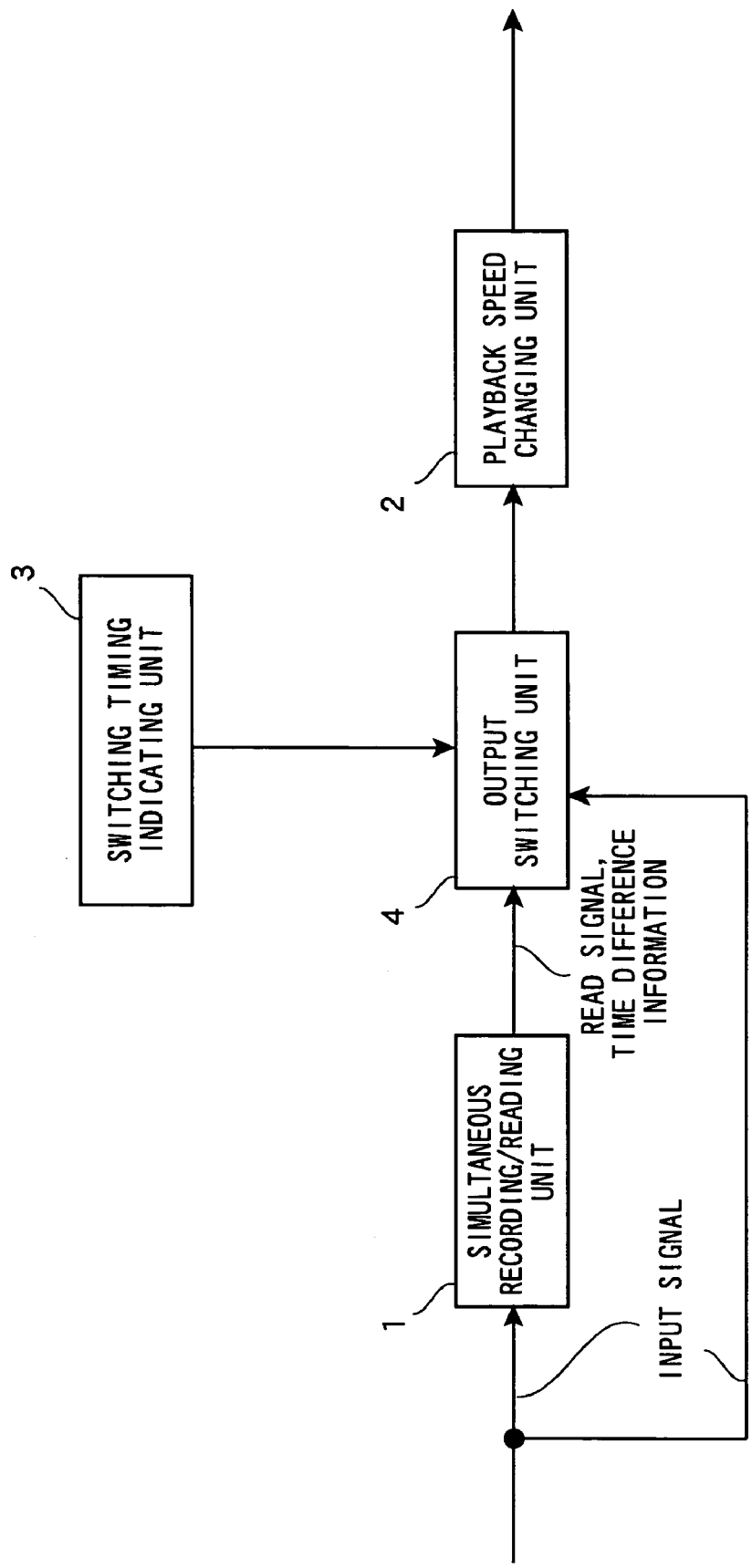
FIG. 4 is a functional block diagram showing the recording/playback device when a playback speed changing process is performed on a signal output from the output switching unit.

Here, the playback speed changing unit 2 performs a speed changing process on a signal output from the output switching unit 4 FIG. 4 is a block diagram showing the functional structure of the recording/playback device when the speed changing process is performed on the signal output from the output switching unit 2. In this case, the output switching unit 4 is configured so as to output, to the playback speed changing unit 2, an output signal added with information indicative of whether the output signal is an input signal or a read signal and the time difference information detected by the simultaneous recording/reading unit 1. Also, the playback speed changing unit 2 is configured to include a means that determines whether the signal output from the output switching unit 4 is an input signal or a read signal. When the signal output from the output switching unit 4 is a read signal, the playback speed changing unit 2 outputs the read signal with its playback speed being changed to a predetermined speed based on the time difference information added to the read signal. On the other hand, when the signal output from the output switching unit 4 is an input signal, the playback speed changing unit 2 outputs the input signal as it is without performing a playback speed changing process.

Figure 5:
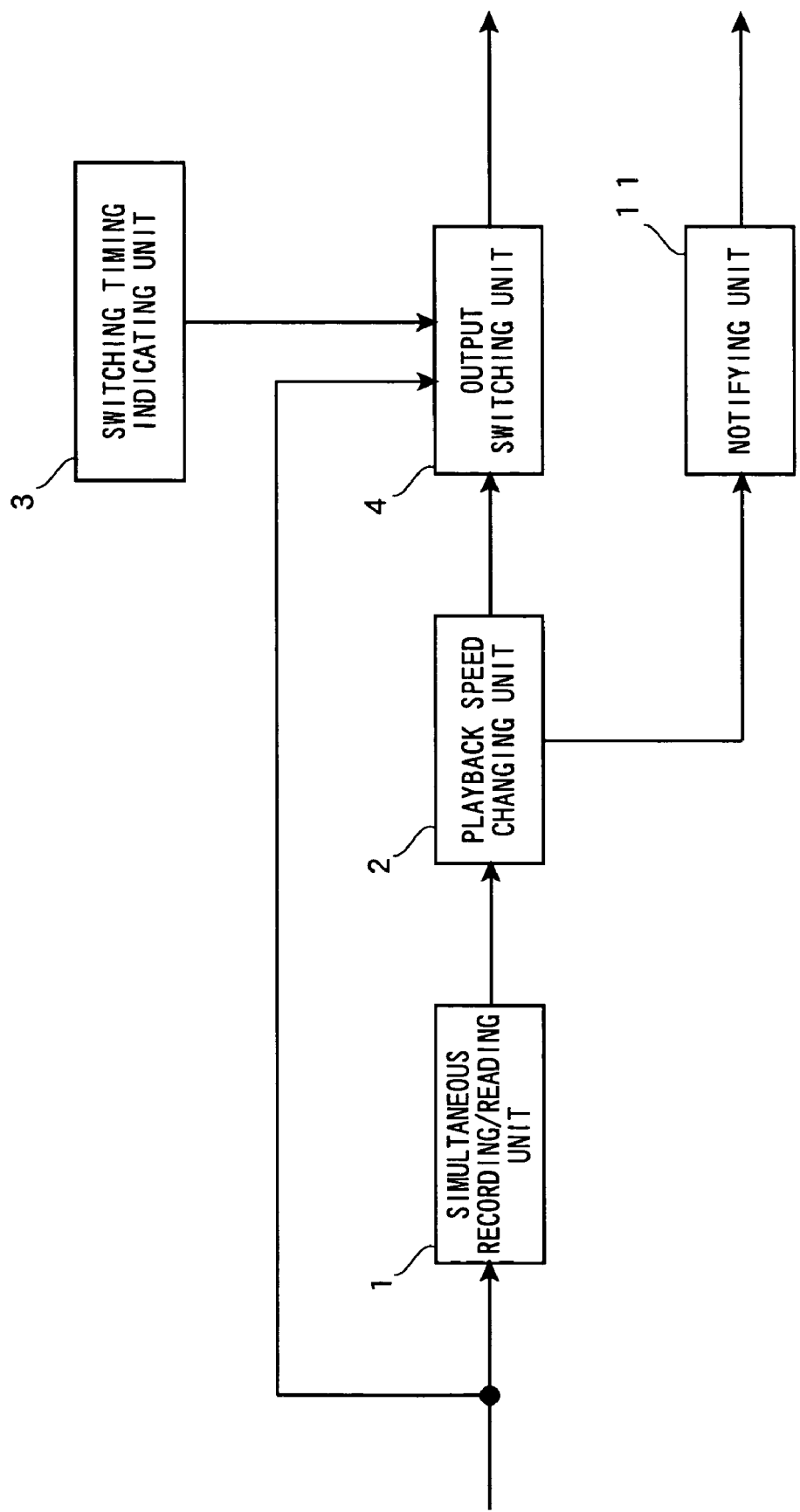
FIG. 5 is a functional block diagram showing the recording/playback device according to the first embodiment of the present invention provided with a notifying section.

Also, the recording/playback device may include a notifying unit that notifies the user that the playback speed has been changed to single speed (that is, catching-up playback has caught up with real time live broadcast, with a slight delay in a strict sense, though). FIG. 5 is an illustration showing a structure in which a notifying unit 11 is added to the structure shown in FIG. 1. Upon knowing the fact that the playback speed of the read signal has been changed to single speed at the playback speed changing unit 2, the notifying unit 11 notifies the user that the playback has been changed to single-speed playback or that the output can be switched to real time live broadcast. To do this, any notifying scheme can be taken. By way of example, the change to single speed may be displayed on a screen. Alternatively, a sound, such as an alarm, may be used for notification. Still alternatively, a lamp provided on the recording/playback device may be illuminated for notification.

After switching to real time live broadcast, the recording process may be continued or stopped. When the recording process is continued, the entire program recorded can be advantageously viewed repeatedly afterward. When the recording process is stopped, the capacity of the storage device can be advantageously saved.

Second Embodiment

Figure 6:
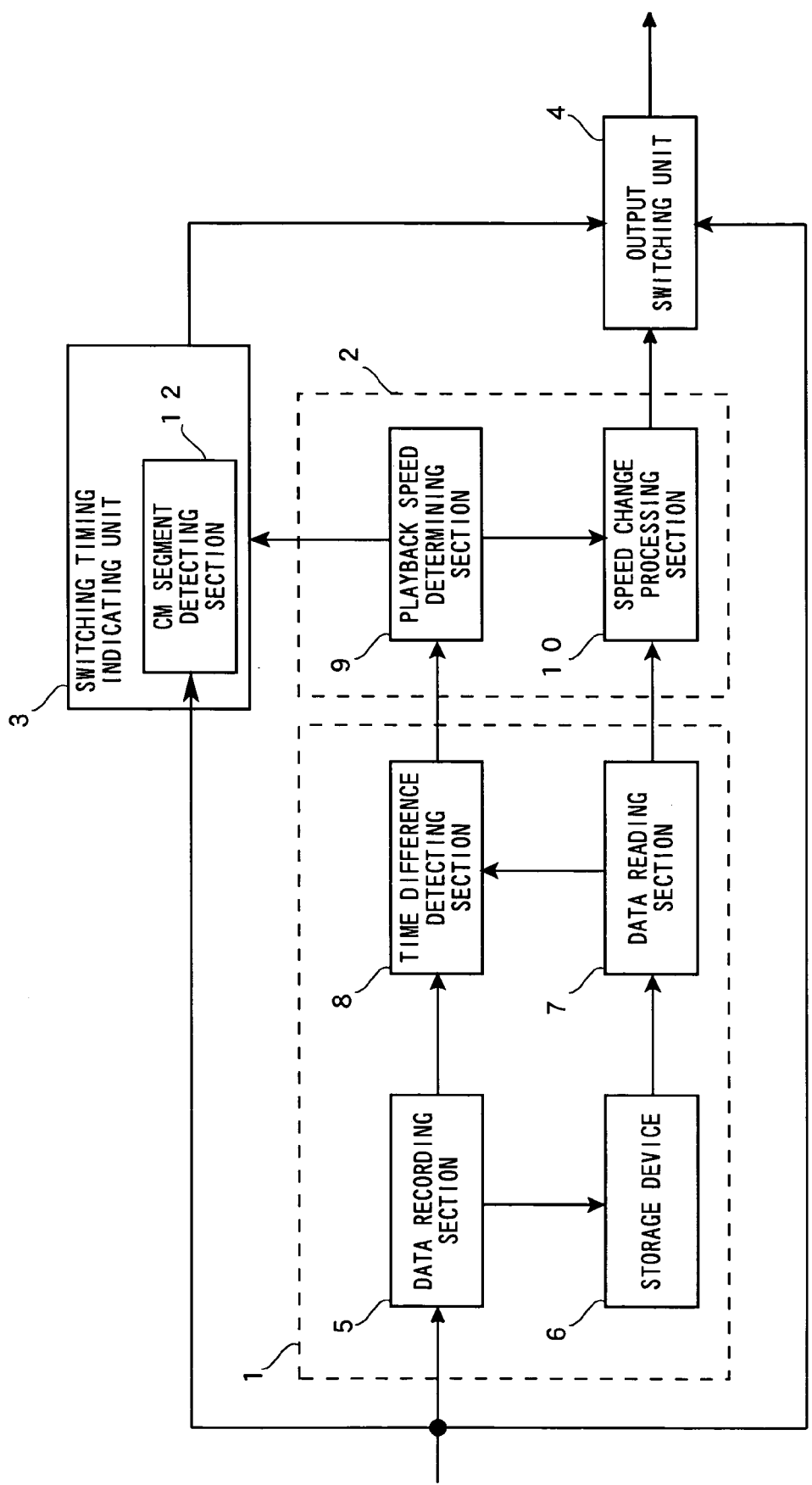
FIG. 6 is a functional block diagram showing a recording/playback device according to a second embodiment of the present invention.

Next, with reference to FIG. 6, a recording/playback device according to a second embodiment of the present invention is described below. In FIG. 6, a switching timing indicating unit 3 is equivalent to the switching timing indicating unit 3 described with reference to FIG. 1 in the first embodiment provided with a commercial message (CM) segment detecting section 12. The other components are identical to those in the first embodiment. Therefore, the same components are provided with the same reference numerals, and are not described in detail herein.

In FIG. 6, the CM segment detecting section 12 analyzes the input signal (real time live broadcast) to detect whether broadcast is currently in a CM segment. Here, for example, the CM segment detecting section 12 uses a CM segment detecting scheme in which audio stereo broadcast and audio monaural or bilingual broadcast are detected and, when stereo broadcast is partially inserted, the inserted portion is determined as a CM segment. The CM segment detecting scheme is not restricted to the above, and may be a scheme based on a switching timing of moving pictures or periodicity of occurrence of soundless segments.

Figure 7:
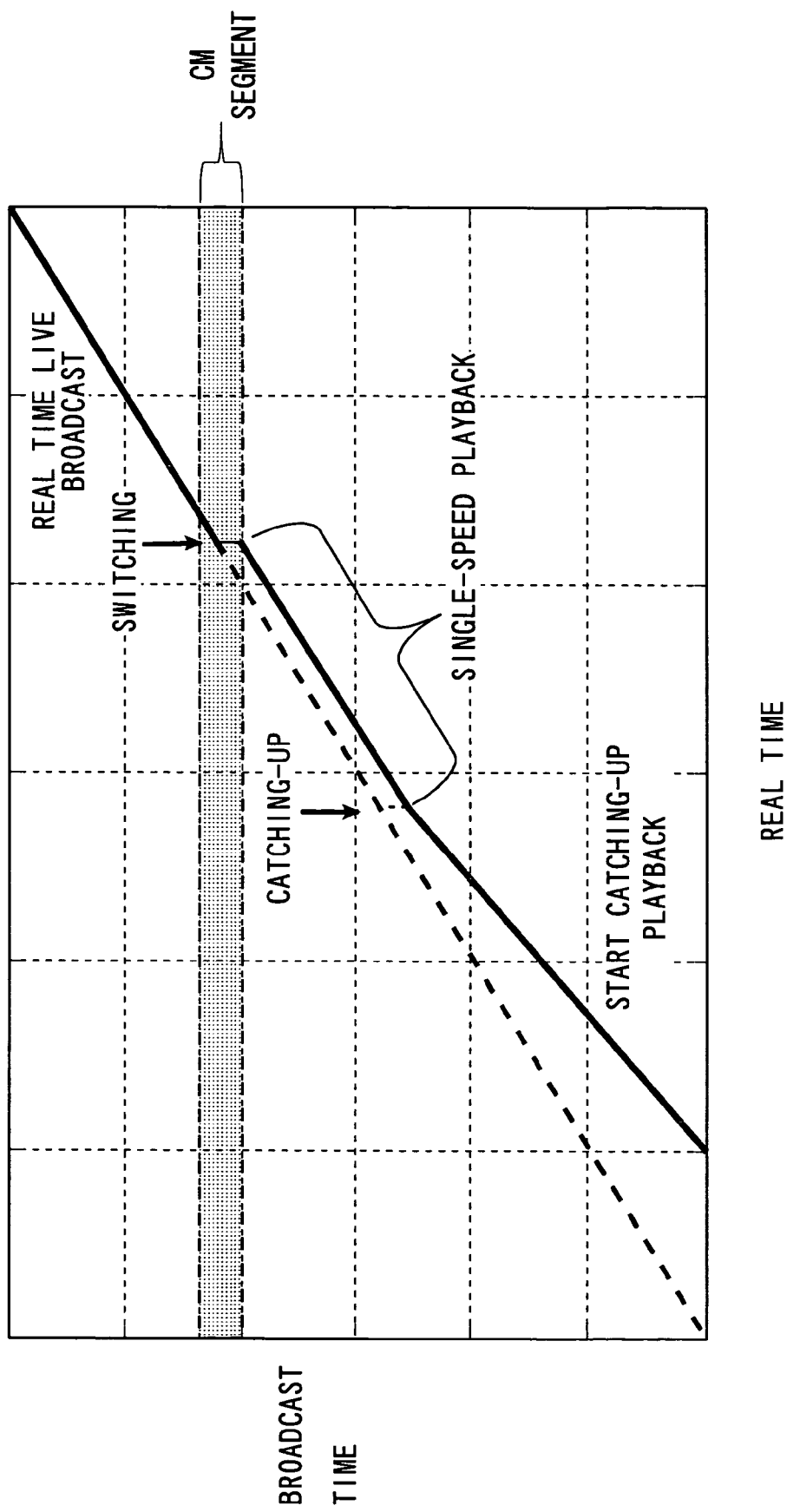
FIG. 7 is an illustration showing an output from the output switching unit 4 according to the second embodiment of the present invention.

As with the first embodiment, the playback speed determining section 9 determines the playback speed as single speed when the time difference information detected by the time difference detecting section 8 has a value that is below a predetermined value. Then, the playback speed determining section 9 instructs the speed change processing section 10 to change the playback speed to single speed, and also notifies the switching timing indicating unit 3 of this determination. Upon receiving this notification, the switching timing indicating unit 3 instructs the output switching unit 4 to switch the output from the read signal to the input signal not based on a control signal supplied through an operation by the user using a remote controller or the like but based on the information output from the CM segment detecting section 12 indicating whether broadcast is in the CM segment. That is, when the CM segment detecting section 12 detects a CM segment during single-speed playback after playback catches up with real time live broadcast, the switching timing indicating unit 3 issues a switching instruction to the output switching unit 4. The output switching unit 4 then switches the output from the read signal to the input signal. FIG. 7 depicts the output from the output switching unit 4.

As such, in the second embodiment, a CM segment is detected during single-speed playback after catching-up. Then, during the CM segment, catching-up playback is automatically changed to real time live broadcast. Therefore, sound discontinuity during program viewing can be prevented without requiring the user to perform an operation for indicating a switching timing.

Third Embodiment

Figure 8:
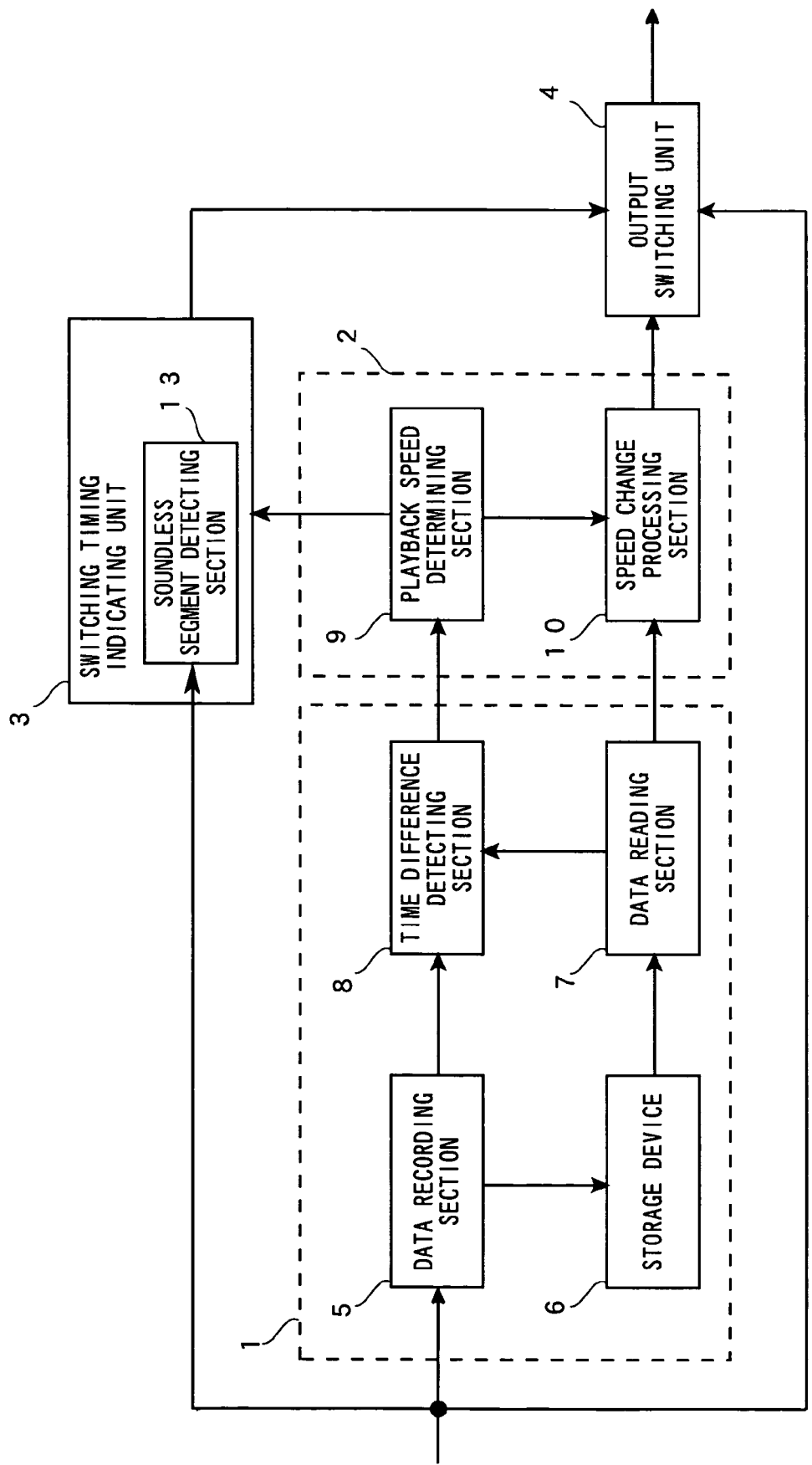
FIG. 8 is a functional block diagram showing a recording/playback device according to a third embodiment of the present invention.

With reference to FIG. 8, a recording/playback device according to a third embodiment of the present invention is described below. FIG. 8 is an illustration showing one example of the recording/playback device according to the third embodiment. In FIG. 8, a switching timing indicating unit 3 is equivalent to the switching timing indicating unit 3 described in the second embodiment with reference to FIG. 6 with the CM segment detecting section 12 being replaced by a soundless segment detecting section 13. The other components are identical to those in the second embodiment. Therefore, the same components are provided with the same reference numerals, and are not described in detail herein.

In FIG. 8, the soundless segment detecting section 13 analyzes the input signal to detect whether broadcast is currently in a soundless segment. Here, to detect a soundless segment, a sound detecting scheme using a normal sound power level can be taken. In such a scheme, a sound power level of the input signal may be compared with a predetermined threshold level. Alternatively, the detecting scheme may not be level-dependent such that a soundless level is estimated by continuously monitoring the input signal and, based on the estimation results, the threshold level is appropriately changed.

As with the second embodiment, the switching timing indicating unit 3 instructs the output switching unit 4 to switch the output from the read signal to the input signal based on the information output from the soundless segment detecting section 13 regarding a soundless segment. That is, when the soundless segment detecting section 13 detects a soundless segment during single-speed playback after playback catches up with real time live broadcast, the switching timing indicating unit 3 issues a switching instruction to the output switching unit 4. The output switching unit 4 then switches the output from the read signal to the input signal.

As described above, in the third embodiment, a soundless segment is detected during single-speed playback after catching-up. Then, during the soundless segment, catching-up playback is automatically changed to real time live broadcast. This achieves a change to real time live broadcast without making the user feel a sound dropout of the program.

Fourth Embodiment

Figure 9:
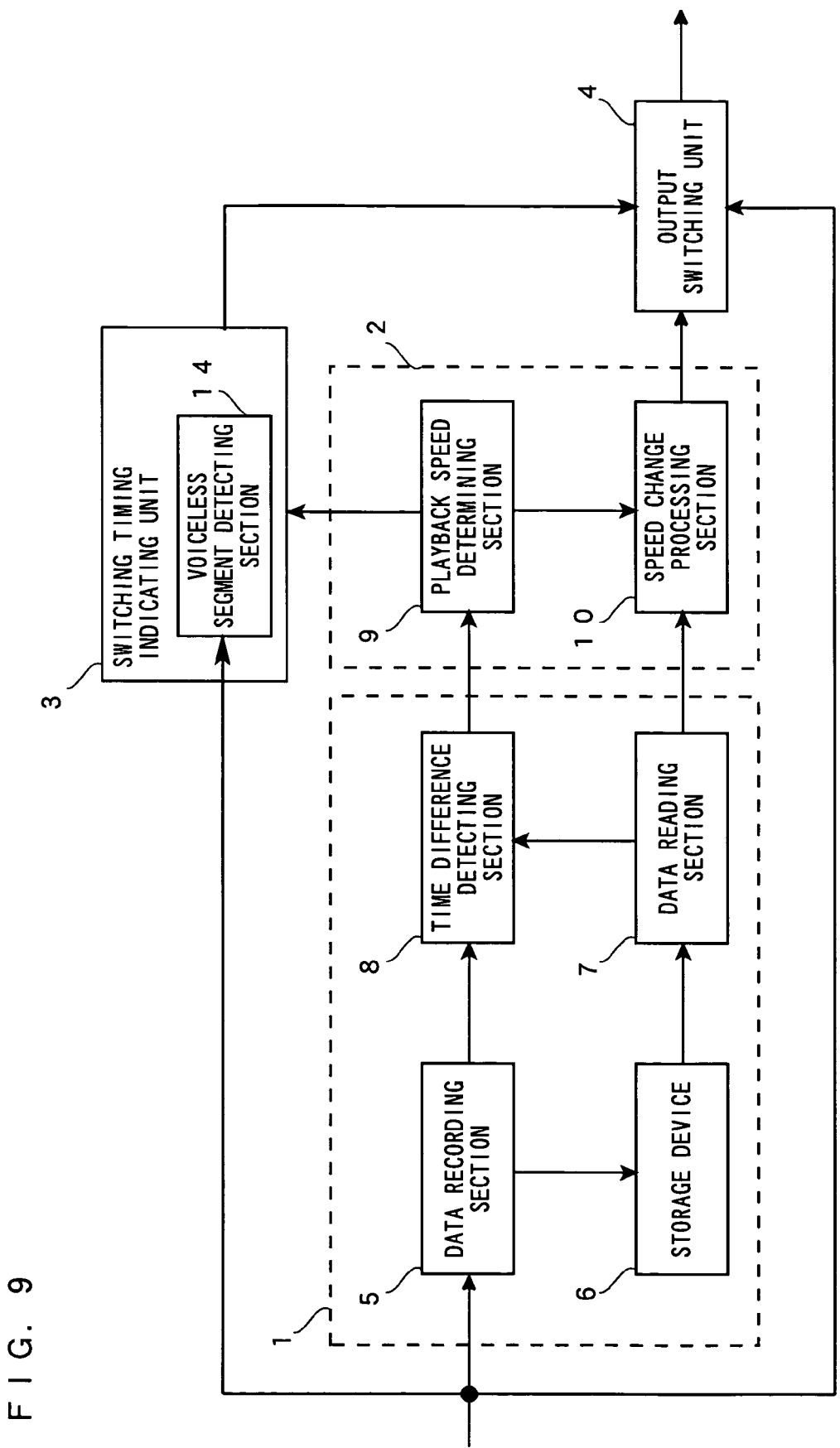
FIG. 9 a functional block diagram showing a recording/playback device according to a fourth embodiment of the present invention.
Figure 10:
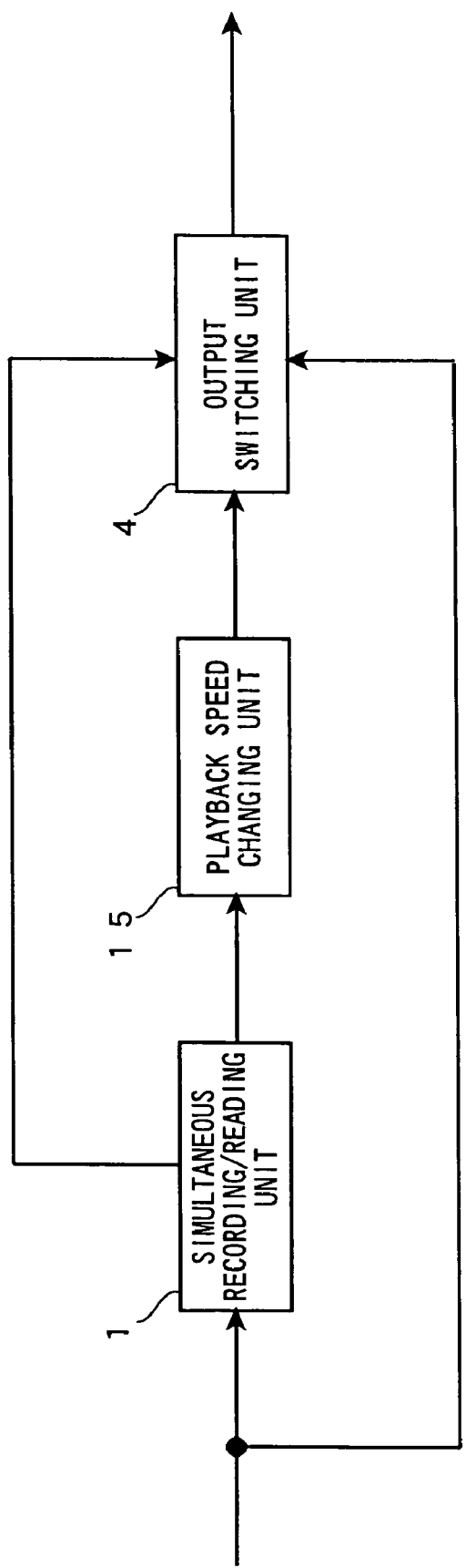
FIG. 10 is a functional block diagram showing a conventional recording/playback device.
Figure 11:
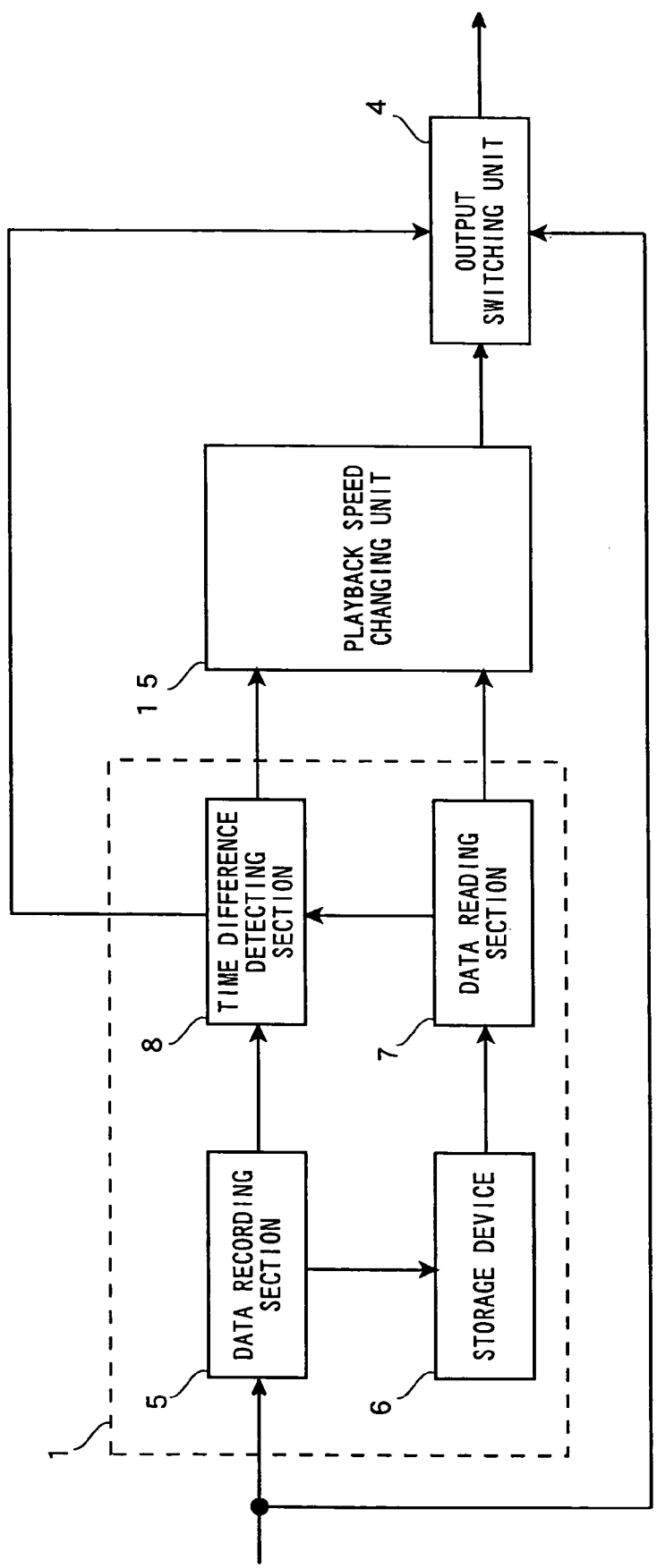
FIG. 11 is a block diagram showing a functional structure of each of the simultaneous recording/reading unit 1 and a playback speed changing unit 15 of FIG. 10.

With reference to FIG. 9, a recording/playback device according to a fourth embodiment of the present invention is described below. FIG. 9 is an illustration showing one example of the recording/playback device according to the fourth embodiment. In FIG. 9, a switching timing indicating unit 3 is equivalent to the switching timing indicating unit 3 described in the second embodiment with reference to FIG. 6 with the CM segment detecting section 12 being replaced by a voiceless segment detecting section 14. The other components are identical to those in the second embodiment. Therefore, the same components are provided with the same reference numerals, and are not described in detail herein.

In FIG. 9, the voiceless segment detecting section 14 analyzes the input signal to detect whether broadcast is currently in a voiceless segment. The voiceless segment is a segment in which sound other than human voice is produced. For example, a scene only with hand-clapping in an ovation corresponds to a voiceless segment. Here, to detect a voiceless segment, an exemplary scheme to be taken is such that a normal sound detecting means using a normal power level and a vowel pitch detecting means are combined to determine a segment at a high sound power level and including a detectable vowel pitch as a voice segment and other segments as voiceless segments. The sound detecting means using the sound power level can be similar to that for use in the third embodiment. The vowel pitch detecting means can take a scheme of detecting a repetitive pitch waveform by calculating an autocorrelation function or a scheme of detecting the presence or absence of pitch periodicity by cepstrum calculation.

As with the second embodiment, the switching timing indicating unit 3 instructs the output switching unit 4 to switch the output from the read signal to the input signal based on the information output from the voiceless segment detecting section 14 regarding a voiceless segment. That is, when the voiceless segment detecting section 14 detects a voiceless segment during single-speed playback after playback catches up with real time live broadcast, the switching timing indicating unit 3 issues a switching instruction to the output switching unit 4. The output switching unit 4 then switches the output from the read signal to the input signal.

As described above, in the fourth embodiment, a voiceless segment is detected during single-speed playback after catching-up. Then, during the voiceless segment, catching-up playback is automatically changed to real time live broadcast. This achieves a change to real time live broadcast without dropout of human voice even when no soundless segment is present in the program.

Here, in the present embodiment, the switching timing indicating unit 3 only includes the voiceless segment detecting section 14. This is not meant to be restrictive in the present invention. Alternatively, the switching timing indicating unit 3 may further include a combination of the CM segment detecting section 12 and the voiceless segment detecting section 13. Also, the switching timing may be determined based on image and sound information. Furthermore, in the case of compressed data attached with indexing (tag information), such as data of MPEG 7, for example, the switching timing may be determined based on the tag information.

While the invention has been described in detail, the foregoing description is in all aspects illustrative and not restrictive. It is understood that numerous other modifications and variations can be devised without departing from the scope of the invention.

What is claimed is:

1. A recording/playback device, comprising:
   a simultaneous recording/reading unit operable to simultaneously record an input signal in a storage device and to read an input signal recorded in the storage device as a read signal;
   a playback speed changing unit operable to change a playback speed of the read signal without a sound dropout;
   an output switching unit operable to alternatively select one of the input signal and the read signal and to output the selected signal to an output device; and
   a switching timing indicating unit operable to indicate a switching timing to the output switching unit, wherein:
   the playback speed changing unit is further operable to increase the playback speed of the read signal higher than single speed and, after playback is started, when a delay time of the read signal with respect to the input signal is below a predetermined time, is further operable to decrease the playback speed of the read signal to single speed, and
   after the delay time of the read signal with respect to the input signal is below the predetermined time, upon receiving an indication from the switching timing indicating unit, the output switching unit is further operable to switch an output from the read signal to the input signal.

2. The recording/playback device according to claim 1, wherein
   the switching timing indicating unit is further operable to indicate the switching timing to the output switching unit upon receiving an instruction from a user.

3. The recording/playback device according to claim 1, wherein
   the playback speed changing unit includes:
   a playback speed determining unit operable to appropriately determine the playback speed of the read signal so that the playback speed is made close to single speed in a stepwise manner when a delay time of a reading time of the read signal with respect to a recording time of the input signal has a value larger than a predetermined threshold, and then to determine, when the delay time of the reading time has a value smaller than the predetermined threshold, the playback speed of the read signal as being single speed; and a speed change processing unit operable to change the playback speed of the read signal to the playback speed determined by the playback speed determining unit.

4. The recording/playback device according to claim 1, further comprising a notifying unit operable to notify a user that the playback speed of the read signal is changed to single speed when the delay time of the read signal with respect to the input signal is below the predetermined time and the playback speed changing unit changes the playback speed of the read signal to single speed.

5. The recording/playback device according to claim 1, wherein the switching timing indicating unit includes a CM segment detecting unit operable to detect a CM segment in the input signal, and is operable to instruct the output switching unit to switch an output signal during the CM segment detected by the CM segment detecting unit.

6. The recording/playback device according to claim 1, wherein the switching timing indicating unit includes a soundless segment detecting unit operable to detect a soundless segment in the input signal, and is operable to instruct the output switching unit to switch an output signal during the soundless segment detected by the soundless segment detecting unit.

7. The recording/playback device according to claim 1, wherein the switching timing indicating unit includes a voiceless segment detecting unit operable to detect a voiceless segment in the input signal, and is operable to instruct the output switching unit to switch an output signal during the voiceless segment detected by the voiceless segment detecting unit.

* * * * *